(12) United States Patent
Thomsen et al.

(10) Patent No.: US 7,538,054 B2
(45) Date of Patent: May 26, 2009

(54) GREY GLASS COMPOSITION INCLUDING ERBIUM, NEODYMIUM AND/OR PRASEODYMIUM

(75) Inventors: Scott V. Thomsen, South Lyon, MI (US); Anthony V. Longobardo, Oak Grove, MI (US); Leonid M. Landa, Brownstown, MI (US); Ksenia A. Landa, Brownstown, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 722 days.

(21) Appl. No.: 11/199,362

(22) Filed: Aug. 9, 2005

(65) Prior Publication Data

US 2007/0037687 A1 Feb. 15, 2007

(51) Int. Cl.
*C03C 3/095* (2006.01)
*C03C 3/087* (2006.01)

(52) U.S. Cl. .............................. 501/71; 501/70; 501/65
(58) Field of Classification Search ................... 501/64, 501/70, 71
See application file for complete search history.

(56) References Cited

U.S. PATENT DOCUMENTS

| | | | |
|---|---|---|---|
| 3,143,683 A | 8/1964 | Duncan et al. | |
| 4,376,829 A * | 3/1983 | Daiku | 501/64 |
| 4,390,637 A * | 6/1983 | Daiku | 501/64 |
| 4,405,881 A | 9/1983 | Kobayashi | |
| 4,882,302 A * | 11/1989 | Horiuchi et al. | 501/27 |
| 4,999,321 A | 3/1991 | Kohli | |
| 5,559,061 A * | 9/1996 | Bilek et al. | 501/69 |
| 6,326,324 B1 * | 12/2001 | Sakaguchi et al. | 501/64 |
| 6,420,288 B2 * | 7/2002 | Schweiger et al. | 501/7 |
| 6,573,207 B2 | 6/2003 | Landa et al. | |
| 6,610,622 B1 | 8/2003 | Landa et al. | |
| 6,716,780 B2 | 4/2004 | Landa et al. | |
| 6,914,024 B2 | 7/2005 | Anderson | |
| 7,008,891 B2 * | 3/2006 | Kobayashi et al. | 501/6 |
| 2001/0006927 A1 | 7/2001 | Cochran et al. | |
| 2002/0160901 A1 | 10/2002 | Landa et al. | |
| 2003/0114290 A1 | 6/2003 | Landa et al. | |
| 2004/0038799 A1 | 2/2004 | Landa et al. | |
| 2004/0110624 A1 | 6/2004 | Hulme et al. | |
| 2004/0116268 A1 * | 6/2004 | Kobayashi et al. | 501/6 |
| 2004/0116271 A1 | 6/2004 | Thomsen et al. | |
| 2004/0209757 A1 | 10/2004 | Landa et al. | |
| 2005/0020430 A1 | 1/2005 | Thomsen et al. | |

FOREIGN PATENT DOCUMENTS

| | | |
|---|---|---|
| GB | 2 325 927 | 12/1998 |
| SU | 1 470 679 | 4/1989 |
| SU | 1 706 979 | 1/1992 |

OTHER PUBLICATIONS

International Search Report dated Jan. 15, 2007.
XP-002412636, "Gold-Colored Glass Composition Containing Specified Oxide(s) as Coloring Agent" (1 pg).
XP-002412634, "Glass Composition Contain Oxide(s) of Silicon, Calcium, Aluminum, Magnesium, Sodium, Potassium, Cerium, Neodymium, Praseodymium, Lanthanum, Cobalt, Nickel Chromium Iron Barium", (1 pg).
XP-0024123635. Smoke Glass Contain Silicon, Calcium, Magnesium, Sodium, Potassium, Rare Earth Metal, Iron, Cobalt, Chromium, Nickel, Maganese, Cerium Oxide, (1pg).
"Colored Glasses" WEYL, The Society of Glass Technology, 1951 (12pgs).

* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

A grey glass composition is suitable for architectural and/or vehicle window applications. The grey glass may achieve a combination of good visible transmission, a low SHGC, and desirable coloration. In certain example embodiments, the grey glass includes iron, erbium (Er), neodymium (Nd) and/or praseodymium (Pr) in the colorant portion of the glass.

15 Claims, No Drawings

GREY GLASS COMPOSITION INCLUDING ERBIUM, NEODYMIUM AND/OR PRASEODYMIUM

This invention relates to glass compositions and methods of making the same. More particularly, this invention relates to glass compositions including iron (Fe), erbium (Er), neodymium (Nd) and/or praseodymium (Pr), which may be grey in color. Such glass compositions are useful, for example, in windows in the architectural and/or automotive industry(ies).

BACKGROUND OF THE INVENTION

The automotive industry, for a number of years, has desired glass having grey color (sometimes called "neutral grey") for automotive window applications. In certain situations, it is also desirable to have grey colored glass for architectural window applications. At the same time, it is also desirable for transmission in the UV and/or IR ranges of the light spectrum to be minimized.

A glass window or other glass article is said to have the desirable color "grey" when it has a dominant wavelength of from 435 nm to 570 nm (this dominant wavelength range defines the color "grey" herein). Moreover, grey glass often has an excitation purity of less than about 4.5%. In certain embodiments, it may be preferable to have a dominant wavelength of from 470 nm to 570 nm, or even from 480-560 nm, with purity of from about 0.2 to 4.5%.

While glass having "grey" color is often desirable, there sometimes also exists a need or desire to achieve solar control for architectural and/or other applications. Example solar control parameters include:

Lta as visible light transmission,

SHGC (Solar Heat Gain Coefficient) (Air Mass 1.5), and/or

IR as infrared light transmission.

Glass thickness ranges of from about 1-6 mm, more preferably from about 3-4 mm, are typically used when measuring the aforesaid characteristics. These thickness ranges are generally recognized as conventional thicknesses for glass sheets made by the float glass process, as well as recognized thickness ranges in the automotive and/or architectural industries.

For certain example non-limiting architectural applications, it is often desirable for a glass to realize one or more of the following characteristics at one or more of the aforesaid thicknesses:

Lta: at least about 55% (more preferably >=about 60%, or 65%)

SHGC no greater than about 0.67 (more preferably <=0.65, or 0.64).

Classically formulated grey glasses often include low levels of iron (i.e., less than 0.2% total iron) along with cobalt and nickel oxides. Unfortunately, while this type of glass may achieve satisfactory coloration in certain instances, it typically suffers from undesirable solar characteristics (e.g., too high of a SHGC—typical grey glass has an SHGC around 0.8 at 4 mm thickness). Certain nickel-free grey glasses combine selenium (Se) and cobalt (Co) oxide with iron oxide, but also suffer from poor solar performance characteristics.

In view of the above, it is apparent that there exists a need in the art for a glass composition which may achieve desired grey color in combination with an improved SHGC and/or visible transmission.

SUMMARY OF EXAMPLE EMBODIMENTS OF THE INVENTION

In certain example embodiments of this invention, a grey glass (i.e., having a dominant wavelength of from 435 nm to 570 nm) is provided which also has a rather low SHGC and/or acceptable visible transmission.

In certain example embodiments of this invention, a grey glass composition has a colorant portion including iron (Fe), erbium (Er), neodymium (Nd) and/or praseodymium (Pr). Good solar performance (e.g., lower SHGC) is realized by providing the glass with from about 0.25% to 0.80% total iron (expressed herein as $Fe_2O_3$) (more preferably from about 0.30% to 0.60%, and most preferably from about 0.35% to 0.55% total iron) and by using a glass redox of from about 0.09 to 0.50. The resulting glass may have an SHGC of no greater than about 0.67 (more preferably no greater than about 0.65, or no greater than about 0.64, and sometimes no greater than about 0.62 or even 0.60) at an example reference 4 mm thickness.

In certain example embodiments of this invention, desirable grey or neutral color may be achieved by combining ferric/ferrous blue-green color with indigo-blue of cobalt (Co) and compensation with red/pink erbium (Er) chromophore. The brown utilized may be provided by a combination of neodymium (Nd) and praseodymium (Pr), optionally enhanced by addition of nickel (Ni). In certain example embodiments of this invention, due to the presence of this brown component, glass may only have from 0 to 0.003% Se which may be desirable in certain situations.

In certain example embodiments of this invention, the glass comprises, by weight %: (a) from about 0.20% to 0.80% total iron ($Fe_2O_3$) (more preferably from about 0.30% to 0.60%, and most preferably from about 0.35% to 0.55% total iron), (b) from about 0.01% to 1.0% erbium oxide (e.g., $Er_2O_3$) (more preferably from about 0.1% to 0.85%, even more preferably from about 0.20% to 0.80%), (c) from about 0.001% to 0.2% cobalt oxide (e.g., $Co_2O_3$) (more preferably from about 0.001% to 0.05%, and most preferably from about 0.002% to 0.01%), (d) from about 0% to 0.5% nickel oxide (e.g., NiO) (more preferably from about 0.001% to 0.10%, and most preferably from about 0.01% to 0.06%), (e) from about 0.001% to 1.0% neodymium oxide (e.g., $Nd_2O_3$) (more preferably from about 0.005% to 0.5%, even more preferably from about 0.05% to 0.3%), and (f) from about 0.001% to 1.0% praseodymium oxide (e.g., $Pr_2O_3$) (more preferably from about 0.005% to 0.5%, even more preferably from about 0.01% to 0.3%). One or more of these elements may not be present (i.e., removed or deleted) in certain example embodiments of this invention.

In certain embodiments, the glass may be grey in color and have an excitation purity (Pe) of no greater than about 4.5%, and a dominant wavelength in the range of from 435 nm to 570 nm.

In certain example embodiments, there is provided a grey glass comprising:

a base glass portion comprising:

| Ingredient | wt. % |
|---|---|
| $SiO_2$ | 67-75% |
| $Na_2O$ | 10-20% |
| CaO | 5-15% |
| MgO | 0-7% |
| $Al_2O_3$ | 0-7% |

-continued

| Ingredient | wt. % |
|---|---|
| $K_2O$ | 0-5% |
| BaO | 0-1% | and a colorant portion comprising or consisting essentially of:
  total iron: 0.20-0.80%
  erbium oxide: 0.01-1.0%
  neodymium oxide: 0.001-1.0%
  praseodymium oxide: 0.001-1.0%
  nickel oxide: 0 to 0.5%
  selenium: 0.0-0.03%
  cobalt oxide: 0.001-0.2% wherein the grey glass has a dominant wavelength in the range of from 435 nm to 570 nm.

In other example embodiments of this invention, there is provided a glass comprising:

| Ingredient | wt. % |
|---|---|
| total iron: | 0.20-0.80% |
| erbium oxide: | 0-1.0% |
| neodymium oxide: | 0.001-1.0% |
| praseodymium oxide: | 0.001-1.0%. |

While grey color is preferred in certain embodiments, this invention is not so limited. Colorant portions herein may be used in conjunction with other glass colors in alternative embodiments of this invention.

DETAILED DESCRIPTION OF CERTAIN EXAMPLE EMBODIMENTS OF THE INVENTION

Glasses according to different embodiments of this invention may be used, for example, in architectural glass applications (e.g., in monolithic and/or IG window units), in the automotive industry (e.g., windshields, backlites, side windows, etc.), and/or in other suitable applications. Such glasses may be grey, or otherwise colored in different embodiments of this invention.

Certain glasses according to this invention utilize soda-lime-silica flat glass as their base composition/glass, to which is added certain ingredients making up a unique colorant portion. An exemplary soda-lime-silica base glass according to certain embodiments of this invention, on a weight percentage basis, includes the following basic ingredients:

TABLE 1

Example Base Glass

| Ingredient | Wt. % |
|---|---|
| $SiO_2$ | 67-75% |
| $Na_2O$ | 10-20% |
| CaO | 5-15% |
| MgO | 0-7% |
| $Al_2O_3$ | 0-5% |
| $K_2O$ | 0-5% |
| BaO | 0-1% |

Other minor ingredients, including various conventional and refining aids, such as $SO_3$, carbon, gypsum, $CaSO_4$ and/or the like may also be included in the base glass. In certain embodiments, for example, glass herein may be made from batch raw materials silica sand, soda ash (or NaOH as a soda source), dolomite, limestone, with the use of salt cake ($SO_3$) and/or Epsom salts (e.g., about a 1:1 combination of both) as refining agents. Reducing agent(s) such as Si (metallic), Si, silicon monoxide, SiO, sucrose, and/or carbon may also be used. Preferably, soda-lime-silica based glasses herein include by weight from about 10-15% $Na_2O$ and from about 6-12% CaO. While a soda-lime-silica base glass set forth above is preferred in certain embodiments of this invention, this invention is not so limited. Thus, other base glasses (e.g., borosilicate glass) may instead be employed in alternative embodiments.

To the base glass (e.g., see Table 1 above), the instant invention adds a colorant portion which may cause the resulting glass to be grey in color (e.g., dominant wavelength of from 435 nm to 570 nm) and/or achieve desirable solar management properties such as improved (low) SHGC values in combination with acceptable visible transmission. In certain preferred embodiments, the resulting glass is grey in color and has a dominant wavelength of from 480 nm-560 nm (nanometers). Moreover, the resulting glass may have an excitation purity (Pe) no greater than about 4.5%, and most preferably from 0.2% to 4.5%.

In certain embodiments of this invention, an exemplary colorant portion that is added to the base glass is substantially free of cerium (i.e., no more than 0.0030% Ce, CeO, and/or $CeO_2$), and is characterized in final glasses and/or glass batches as set forth in Table 2 below (in terms of weight percentage of the total glass composition):

TABLE 2

EXAMPLE COLORANT PORTION (IN ADDITION TO BASE)

| Ingredient | General (Wt. %) | More Preferred | Possible |
|---|---|---|---|
| total iron (expressed as $Fe_2O_3$): | 0.20 to 0.80% | 0.30 to 0.60% | 0.35 to 0.55% |
| % FeO: | 0.07 to 0.60% | 0.10 to 0.25% | 0.12 to 0.19% |
| erbium oxide (e.g., $Er_2O_3$): | 0 to 1.0% | 0.01 to 1.0% | 0.1 to 0.8% |
| cobalt oxide (e.g., $Co_3O_4$): | 0.001 to 0.2% | 0.001 to 0.05% | 0.002 to 0.01% |
| neodymium oxide (e.g., $Nd_2O_3$): | 0.001 to 1.0% | 0.005 to 0.5% | 0.05 to 0.3% |
| praseodymium oxide (e.g., $Pr_2O_3$): | 0.001 to 1.0% | 0.005 to 0.5% | 0.01 to 0.3% |
| nickel oxide (e.g., NiO): | 0 to 0.5% | 0.001 to 0.10% | 0.01 to 0.06% |
| selenium (Se): | 0 to 0.03% | 0 to 0.003% | 0 to 0.001% |

In certain example embodiments of this invention, the colorant portion is substantially free of other colorants (other than potentially trace amounts). However, it should be appreciated that amounts of other materials (e.g., refining aids, melting aids, colorants and/or impurities) may be present in the glass in certain other embodiments of this invention without taking away from the purpose(s) and/or goal(s) of the instant invention. It is noted that the glass may be free or substantially free of cerium oxide and/or nickel oxide in certain example embodiments of this invention. In certain example embodiments of this invention, the glass may include no more than about 10 ppm chromium oxide, more preferably no more than 6 ppm chromium oxide.

In certain example embodiments of this invention, the colorants are provided so as to permit a grey glass (i.e., having a dominant wavelength of from 435 nm to 570 nm) having a rather low SHGC and/or acceptable visible transmission. The colorant portions is provided in a manner so that good solar performance (e.g., lower SHGC) is realized by providing the glass with from about 0.25% to 0.80% total iron (expressed herein as $Fe_2O_3$) (more preferably from about 0.30% to 0.60%, and most preferably from about 0.35% to 0.55% total iron) and by using a glass redox of from about 0.09 to 0.25 (more preferably from about 0.12 to 0.19). The resulting glass may have an SHGC of no greater than about 0.67 (more preferably no greater than about 0.65, or no greater than about 0.64, and sometimes no greater than about 0.62 or even 0.60) at an example reference 4 mm thickness. Thus, in certain example embodiments, it is possible to provide a glass that can compete with pyrolytic coatings with respect to solar control functionality (e.g., SHGC in combination with desirable visible transmission).

In certain example embodiments of this invention, desirable grey or neutral color may be achieved by combining ferric/ferrous blue-green color (from the iron) with indigo-blue of cobalt (Co) and possible compensation with red/pink erbium (Er) chromophore. The brown utilized may be provided by a combination of neodymium (Nd) and praseodymium (Pr), optionally enhanced by addition of nickel (Ni). In certain example embodiments of this invention, due to the presence of this brown component(s), glass may only have from 0 to 0.003% Se which may be desirable in certain situations (it may be desirable to reduce or eliminate Se in certain instances).

It should be appreciated that, in addition, small amounts of other materials (e.g., refining aids, melting aids, and/or impurities) may be present in the glass such as chromium, manganese, molybdenum, tin, chlorine, zinc, zirconium, Si, sulfate, fluorine, lithium and strontium, without taking away from the purpose(s) and/or goal(s) of the instant invention. It is also noted that certain of the above elements may be removed from the glass in certain example embodiments of this invention, whereas other elements not expressly mentioned herein may be added to the composition. Moreover, it is possible that elements may be present in amounts outside of the above ranges in certain example embodiments of this invention, as the ranges above are provided for purposes of example and understanding only.

Glasses of this invention, as stated above, may in certain non-limiting embodiments achieve a true grey or neutral grey color. Such a true "grey" color is best defined, as aforesaid, by referring to: (1) "dominant wavelength", and/or (2) "excitation purity." Other colors are also possible in other embodiments of this invention. In certain embodiments, glasses herein include one or more of the following color/solar characteristics when measured at a nominal thickness of from about 1 mm-6 mm (and preferably for most uses, at about 3 mm-4 mm) (the colors are measured transmissive):

TABLE 3

Exemplary Transmissive Color/Solar Characteristics

| Characteristic | General | More Preferred |
| --- | --- | --- |
| SHGC: | <=0.67 | <=0.65 (or .62) |
| L* (Ill. D65, 10 deg. observer): | 85-96 | 86-94 |
| a* (Ill. D65, 10 deg. observer): | −5.0 to +4.0 | −4.0 to +2.0 |
| b* (Ill. D65, 10 deg. observer): | −4.0 to +3.0 | −2.0 to +2.5 |

TABLE 3-continued

Exemplary Transmissive Color/Solar Characteristics

| Characteristic | General | More Preferred |
| --- | --- | --- |
| Lta (visible transmittance): | >=55% | >=60% (or 65%) |
| $IR_{transmission}$: | <=50% | <=46% |

The glasses of this invention achieve the above unique characteristics (i.e., desired color and visible transmission in combination with desired solar management properties) in base glasses (e.g., silicate glasses such as soda-lime-silica, or borosilicate glasses) through the use of the unique colorant portions discussed herein.

The total amount of iron present in the glass and in the colorant portion thereof is expressed herein in terms of $Fe_2O_3$ in accordance with standard practice. This, however, does not imply that all iron is actually in the from of $Fe_2O_3$. Likewise, the amount of iron in the ferrous state is reported herein as FeO, even though all ferrous state iron in the glass may not be in the form of FeO. Iron is usually present in both the ferrous state ($Fe^{2+}$; expressed herein as FeO, even though all ferrous state iron in the glass may not be in the form of FeO) and the ferric state ($Fe^{3+}$). Iron in the ferrous state ($Fe^{2+}$; FeO) is a blue-green colorant, while iron in the ferric state ($Fe^{3+}$) is a yellow-green colorant. The proportion of the total iron in the ferrous state (i.e., FeO) is used to determine the redox state of the glass, and is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. According to certain embodiments of this invention, the colorant portion of the glass composition herein is characterized by a glass redox value (i.e., $FeO/Fe_2O_3$) of from about 0.09 to 0.50, more preferably from about 0.10 to 0.45, and even more preferably from about 0.30 to 0.45.

Moreover, it is noted that glass according to this invention is often made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

Erbium may act as a pink colorant, and may be present in the glass in different oxide states. With regard to Er, unless expressly stated to the contrary, the terms erbium oxide, ErO and $Er_2O_3$ as used herein include not only Er in this/these particular oxide state(s), but also include(s) Er which may be present in other oxide state(s). In certain example embodiments, the erbium oxide colorant may be used to compensate for the fairly high FeO content. In certain example instances, the amount of erbium oxide in the glass may be from about 0.05 to 0.25%.

Cobalt (Co) may act as a blue colorant. It is believed that much of the cobalt in the glass is in the oxide state of $Co_3O_4$. However, other oxide states of cobalt oxide are also possible in glasses according to different embodiments of this invention. Thus, unless expressly stated to the contrary, the terms cobalt oxide, CoO and $Co_3O_4$ as used herein include not only cobalt in this/these particular oxide state(s), but also include(s) cobalt which may be present in other oxide state(s).

With regard to Se, glass compositions may use various sources of Se, such as sodium and/or calcium selenites, iron and/or cobalt selenides, and/or metallic Se powder. Moreover, while Se often combines with iron as iron selenide (FeSe) in glass to produce brown color, and does so in certain example embodiments of this invention, selenium is referred to in the colorant portion herein as "Se" which is meant to include, for example, its state as Se as well as other states in glass such as FeSe. While Se may be present in the colorant portion as discussed above, it is noted that in some embodiments Se need not be present in the glass composition.

Neodymium (Nd) may act as a purplish colorant, whereas praseodymium (Pr) may act as a green colorant. A combination of Nd and Pr in glass (e.g, in oxide form) may act as a brownish colorant. This brownish colorant portion may be enhanced with small amounts of nickel (e.g., NiO) in certain example embodiments of this invention. It is believed that much of the Nd and Pr in glass may be in the oxide state of $Nd_2O_3$ or $Pr_2O_3$, respectively. However, other oxide states of these elements are also possible in glasses according to different embodiments of this invention. Thus, unless expressly stated to the contrary, the terms neodymium oxide, praseodymium oxide, $Nd_2O_3$ and $Pr_2O_3$ as used herein include not only these elements in these particular oxide state(s), but also include(s) these elements which may be present in other oxide state(s).

EXAMPLES

The glasses of this invention may be made from batch ingredients using well known glass melting and refining techniques once given the above final glass analysis. For example, in a conventional batch technique for melting, the following base glass batch was used for the Examples herein (note: the below-listed ingredients in the batch will add up to 100% by weight once oxides thereof are accounted for; thus, they need not add up to one hundred as raw materials):

TABLE 4

Approximate Base Glass for Examples

| Batch Ingredient for Base Glass | Parts by Wt. |
| --- | --- |
| sand | 71.5 |
| soda ash | 23.7 |
| dolomite | 18.32 |
| limestone | 6.1 |
| Epsom salt | 0.9 |
| Sucrose | 0.3 |

In addition to the base glass materials above, the colorant portions for Examples 1-4 herein of different embodiments of this invention were as follows (wt. % of total glass) in amounts added to the base batch:

TABLE 5

Colorant Portions for Examples 1-4

| Compound/Element | Ex. 1 | Ex. 2 | Ex. 3 | Ex. 4 |
| --- | --- | --- | --- | --- |
| total iron ($Fe_2O_3$): | 0.45 | 0.42 | 0.38 | 0.55 |
| % FeO: | 0.14 | 0.16 | 0.18 | 0.17 |
| erbium oxide (e.g., $Er_2O_3$): | 0.85 | 0.55 | 0.45 | 0.12 |
| neodymium oxide (e.g., $Nd_2O_3$): | 0.055 | 0.1 | 0.008 | 0.12 |
| praseodymium oxide (e.g. $Pr_2O_3$): | 0.075 | 0.08 | 0.01 | 0.09 |
| selenium (e.g., Se): | 0.0025 | 0.0005 | 0 | 0.0022 |

TABLE 5-continued

Colorant Portions for Examples 1-4

| Compound/Element | Ex. 1 | Ex. 2 | Ex. 3 | Ex. 4 |
| --- | --- | --- | --- | --- |
| cobalt oxide (e.g., $Co_3O_4$): | 0.0012 | 0.0035 | 0.0024 | 0.021 |
| nickel oxide (e.g., NiO): | 0.0105 | 0.0505 | 0.0055 | 0 |

The glass made in Examples 1-4 were grey or pale black in color, and when made to an example non-limiting reference thickness of about 4 mm had the following solar properties (Lta stands for visible transmission, Ill. D65; and % TS means the amount of total solar):

TABLE 6

Solar Characteristics of Examples 1-4

|  | Ex. 1 | Ex. 2 | Ex. 3 | Ex. 4 |
| --- | --- | --- | --- | --- |
| % Lta: | 61.6 | 62.2 | 58.8 | 63.8 |
| SHGC: | 0.64 | 0.63 | 0.62 | 0.62 |
| % UV: | 18.6 | 28.1 | 42.1 | 39.2 |
| % IR: | 35.5 | 31.4 | 27.2 | 29.1 |
| % TS: | 47.4 | 48.6 | 43.4 | 45.2 |
| a* | +1.1 | +1.25 | −1.04 | −1.8 |
| b* | +0.81 | −0.22 | −0.76 | +0.75 |
| L* | 82.1 | 84.3 | 81.2 | 84.6 |

It can be seen that the glasses of the examples were able to achieve each of: (a) a low SHGC value, (b) good visible transmission, and (c) desirable grayish coloration.

In manufacturing the glasses of Examples 1-4 above, the base glass batch material together with the colorant portion was melted. Thereafter, it was annealed at about 620 degrees C., and then allowed to cool down to room temperature. The example glasses (i.e., samples) were then polished to the desired thickness and spectral measurements above were taken to determine the light transmittance in the wavelength range from 250 to 2,000 nm. The results are set forth in the tables above. Also, each of Examples 1-4 was grey in color and had a dominant wavelength of from 480 nm-560 nm (nanometers), and an excitation purity (Pe) from 0.2% to 4.5%.

Once given the above disclosure many other features, modifications and improvements will become apparent to the skilled artisan. Such features, modifications and improvements are therefore considered to be a part of this invention, the scope of which is to be determined by the following claims:

What is claimed is:

1. A grey glass comprising:

a base glass portion comprising:

| Ingredient | wt. % |
| --- | --- |
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-5% |
| BaO | 0-1% | and a colorant portion consisting essentially of:

| Ingredient | wt. % |
| --- | --- |
| total iron: | 0.20-0.80% |
| erbium oxide: | 0.01-1.0% |
| neodymium oxide: | 0.001-1.0% |
| praseodymium oxide: | 0.001-1.0% |
| nickel oxide: | 0 to 0.5% |
| selenium: | 0.0-0.03% |
| cobalt oxide: | 0.001-0.2% | wherein the grey glass has a dominant wavelength in the range of from 435 nm to 570 nm.

2. The glass of claim 1, wherein the glass has an excitation purity (Pe) of no greater than about 4.5%.

3. The glass of claim 2, wherein said dominant wavelength and excitation purity are measured at a nominal thickness of the glass of from about 3 mm to 4 mm.

4. The glass of claim 1, wherein the glass is substantially free of cerium.

5. The glass of claim 1, further comprising a redox value $FeO/Fe_2O_3$ of from 0.09 to 0.50.

6. The glass of claim 1, wherein the glass has a visible transmission Lta of at least about 55%.

7. The glass of claim 1, wherein the colorant portion includes at least twice as much total iron as erbium oxide.

8. A grey glass comprising:
a base glass portion comprising:

| Ingredient | wt. % |
| --- | --- |
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-5% |
| BaO | 0-1% | and a colorant portion comprising:

| Ingredient | wt. % |
| --- | --- |
| total iron: | 0.20-0.80% |
| erbium oxide: | 0.01-1.0% |
| neodymium oxide: | 0.001-1.0% |
| praseodymium oxide: | 0.001-1.0% |
| nickel oxide: | 0 to 0.5% |
| selenium: | 0.0-0.03% |
| cobalt oxide: | 0.001-0.2% | wherein the grey glass has a dominant wavelength in the range of from 435 nm to 570 nm.

9. The glass of claim 8, wherein the glass has an excitation purity (Pe) of no greater than about 4.5%.

10. The glass of claim 9, wherein said dominant wavelength and excitation purity are measured at a nominal thickness of the glass of from about 3 mm to 4 mm.

11. The glass of claim 8, wherein the glass is substantially free of cerium.

12. The glass of claim 8, further comprising a redox value $FeO/Fe_2O_3$ of from 0.09 to 0.50.

13. The glass of claim 8, wherein the glass has a visible transmission Lta of at least about 55%.

14. The glass of claim 8, wherein the colorant portion includes at least twice as much total iron as erbium oxide.

15. A grey glass comprising:
a base glass portion comprising:

| Ingredient | wt. % |
| --- | --- |
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-5% |
| BaO | 0-1% | and a colorant portion comprising:

| Ingredient | wt. % |
| --- | --- |
| total iron: | 0.20-0.80% |
| erbium oxide: | 0.0-1.0% |
| neodymium oxide: | 0.001-1.0% |
| praseodymium oxide: | 0.001-1.0% |
| nickel oxide: | 0 to 0.5% |
| selenium: | 0.0-0.03% |
| cobalt oxide: | 0.001-0.2% | wherein the grey glass has a dominant wavelength in the range of from 435 nm to 570 nm and an excitation purity (Pe) of no greater than about 4.5%.

* * * * *